US009666030B2

(12) United States Patent
Joung

(10) Patent No.: US 9,666,030 B2
(45) **Date of Patent: *May 30, 2017**

(54) GAMING SYSTEM, A METHOD OF GAMING AND AN ADDITIONAL GAME CONTROLLER

(71) Applicant: Aristocrat Technologies Australia Pty Limited, North Ryde, NSW (AU)

(72) Inventor: Sek Joung, Lakemba (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,130

(22) Filed: May 16, 2016

(65) Prior Publication Data

US 2016/0260292 A1 Sep. 8, 2016

Related U.S. Application Data

(63) Continuation of application No. 14/159,289, filed on Jan. 20, 2014, now Pat. No. 9,342,957, which is a continuation of application No. 12/788,779, filed on May 27, 2010, now Pat. No. 8,636,581.

(30) Foreign Application Priority Data

Jun. 3, 2009 (AU) ................................ 2009902542

(51) Int. Cl.
*G06F 17/00* (2006.01)
*G07F 17/32* (2006.01)

(52) U.S. Cl.
CPC ...... *G07F 17/3258* (2013.01); *G07F 17/3244* (2013.01); *G07F 17/3267* (2013.01)

(58) Field of Classification Search
CPC ............. G07F 17/3258; G07F 17/3244; G07F 17/3267
USPC ................................................ 463/16–20, 26
See application file for complete search history.

(56) References Cited

U.S. PATENT DOCUMENTS

| | | | |
|---|---|---|---|
| 5,489,101 | A | 2/1996 | Moody |
| 5,531,448 | A | 7/1996 | Moody |
| 6,461,240 | B1 | 10/2002 | Perkins |
| 7,568,973 | B2 | 8/2009 | Iddings et al. |
| 8,057,293 | B2 | 11/2011 | Oomori |
| 2002/0190467 | A1 | 12/2002 | Braun |

(Continued)

FOREIGN PATENT DOCUMENTS

| | | | |
|---|---|---|---|
| CA | 2571434 | A1 | 6/2007 |
| CA | 2589243 | A1 | 11/2007 |

(Continued)

*Primary Examiner* — Michael Cuff
(74) *Attorney, Agent, or Firm* — McAndrews, Held & Malloy, Ltd.

(57) ABSTRACT

A method of gaming comprising: determining which of a plurality of gaming devices, each operable for independent play of one or more games, are eligible for an additional game; initiating an additional game; and determining in response to initiation of the additional game, which eligible gaming devices will participate in the initiated additional game, the determination including a random determination in respect of at least one of the eligible gaming devices to determine whether the respective eligible gaming device will participate in the additional game.

13 Claims, 8 Drawing Sheets

(56) References Cited

U.S. PATENT DOCUMENTS

| | | | |
|---|---|---|---|
| 2004/0053680 | A1 | 3/2004 | Schultz |
| 2005/0090307 | A1 | 4/2005 | Walker et al. |
| 2006/0025210 | A1 | 2/2006 | Johnson |
| 2007/0060244 | A1 | 3/2007 | Yaldoo |
| 2007/0075494 | A1 | 4/2007 | Abbott |
| 2007/0135195 | A1 | 6/2007 | Albino |
| 2007/0259714 | A1 | 11/2007 | Block |
| 2008/0007003 | A1 | 1/2008 | Davis |
| 2008/0015005 | A1 | 1/2008 | Yaldoo |
| 2008/0036152 | A1 | 2/2008 | Durbin |
| 2008/0039196 | A1 | 2/2008 | Walther |
| 2008/0061507 | A1 | 3/2008 | Durbin |
| 2008/0220857 | A1 | 9/2008 | Kelly |
| 2009/0011825 | A1 | 1/2009 | Lima |
| 2009/0104961 | A1 | 4/2009 | Hamada et al. |
| 2010/0041459 | A1* | 2/2010 | Saffari .................... G07F 17/32 463/19 |
| 2010/0120514 | A1 | 5/2010 | Caputo |
| 2010/0234091 | A1* | 9/2010 | Baerlocher ............. G07F 17/34 463/20 |
| 2011/0039617 | A1 | 2/2011 | Bryant et al. |

FOREIGN PATENT DOCUMENTS

| | | | |
|---|---|---|---|
| CA | 2610143 | A1 | 5/2008 |
| CA | 2631751 | A1 | 11/2008 |
| CN | 101114383 | A | 1/2008 |
| GB | 2403429 | A | 1/2005 |
| JP | 2007061354 | A | 3/2007 |
| JP | 2007136094 | A | 6/2007 |
| JP | 2007300999 | A | 11/2007 |
| MX | 9702820 | A | 2/1998 |
| WO | 2006098836 | A2 | 9/2006 |
| WO | 2007030733 | A2 | 3/2007 |
| WO | 2008022085 | A2 | 2/2008 |
| WO | 2008039403 | A2 | 4/2008 |
| WO | 2008039892 | A2 | 4/2008 |
| WO | 2008109949 | A1 | 9/2008 |

* cited by examiner

GAMING SYSTEM, A METHOD OF GAMING AND AN ADDITIONAL GAME CONTROLLER

RELATED APPLICATIONS

This application is a continuation of U.S. patent application Ser. No. 14/159,289, filed Jan. 20, 2014, expected to issue as U.S. Pat. No. 9,342,957 on May 17, 2016, which is a continuation of U.S. patent application Ser. No. 12/788,779, filed May 27, 2010, now U.S. Pat. No. 8,636,581, issued Jan. 28, 2014, which claims priority to Australian Application No. 2009902542, filed Jun. 3, 2009. The above-identified applications incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system, a method of gaming and an additional game controller.

In some gaming systems, a player of an individual gaming machine can qualify to play a bonus game conducted by another gaming apparatus. For example, a particular gaming outcome may entitle the player to the bonus game.

In other gaming systems a plurality of players may qualify to play a bonus game where players compete against one another, with one or more players receiving an award based on their placing in the bonus game.

While such gaming systems provide players with enjoyment, a need exists for alternative gaming systems in order to maintain or increase player enjoyment.

BRIEF SUMMARY OF THE INVENTION

In a first aspect, the invention provides a method of gaming comprising:

determining which of a plurality of gaming devices, each operable for independent play of one or more games, are eligible for an additional game;

initiating an additional game; and determining in response to initiation of the additional game, which eligible gaming devices will participate in the initiated additional game, the determination including a random determination in respect of at least one of the eligible gaming devices to determine whether the respective eligible gaming device will participate in the additional game.

In an embodiment, the random determination is conducted in respect of all of the eligible gaming devices.

In an embodiment, at least one gaming device is determined to participate without being subject to the random determination.

In an embodiment, a gaming device which caused the additional game to initiate is determined to participate without being subject to the random determination.

In an embodiment, at least one random determination is weighted to provide at least one gaming device with a greater probability of being a participating gaming device relative to at least one other gaming device.

In an embodiment, the additional game is initiated in response to occurrence of a trigger event.

In an embodiment, the trigger event occurs on one of the eligible gaming devices.

In an embodiment, the method comprises determining which of the gaming devices are eligible gaming devices based on which gaming device have been active in a designated period.

In an embodiment, the method comprises determining which of the gaming devices are eligible gaming devices based on whether a designated wager has been made.

In an embodiment, the method comprises determining which of the gaming devices are eligible gaming devices by deeming each of a plurality of designated gaming devices to be an eligible gaming device.

In an embodiment, the method comprises conducting separate additional games for each gaming device which is determined to participate.

In an embodiment, the method comprises conducting a single additional game for all of the gaming devices which are determined to participate, each gaming device operable for independent play of one or more games In an embodiment, the probability of at least one outcome of the additional game is controlled such that at least one gaming device has a higher probability of winning the additional game than at least one other gaming device.

In an embodiment, the probability is controlled in favour of a gaming device which caused the additional game to initiate.

In a second aspect, the invention provides a gaming system comprising:

a plurality of gaming devices, each gaming device operable for independent play of one or more games; and an additional game controller in data communication with the gaming devices, the additional game controller configured to determine, in response to initiation of the additional game, which of the plurality of gaming devices will participate in the initiated additional game, the determination including conducting a random determination in respect of at least one eligible gaming device to determine whether the respective eligible gaming device will participate in the additional game.

In an embodiment, the additional game controller conducts random determinations in respect of all of the eligible gaming devices.

In an embodiment, the additional game controller determines that least one gaming device is to participate without being subject to the random determination.

In an embodiment, a gaming device which caused the additional game to initiate is determined to participate without being subject to the random determination.

In an embodiment, at least one random determination is weighted to provide at least one gaming device with a greater probability of being a participating gaming device relative to at least one other gaming device.

In an embodiment, the additional game is initiated in response to occurrence of a trigger event.

In an embodiment, each of the gaming devices are arranged to determine whether the trigger event occurs on one of the eligible gaming devices.

In an embodiment, the gaming system is arranged to determine which of the gaming devices are eligible gaming devices based on which gaming device have been active in a designated period.

In an embodiment, the gaming system is arranged to determine which of the gaming devices are eligible gaming devices based on whether a designated wager has been made.

In an embodiment, each of a plurality of designated gaming devices are deemed to be an eligible gaming device.

In an embodiment, the additional game controller conducts separate additional games for each gaming device which is determined to participate.

In an embodiment, the additional game controller conducts a single additional game for all of the gaming devices which are determined to participate.

In an embodiment, the probability of at least one outcome of the additional game is controlled by the additional game controller such that at least one gaming device has a higher probability of winning the additional game than at least one other gaming device.

In an embodiment, the probability is controlled in favour of a gaming device which caused the additional game to initiate.

In a third aspect, the invention provides an additional game controller adapted to communicate with a plurality of gaming devices, the additional game controller configured to determine, in response to initiation of an additional game, which of the gaming devices will participate in the initiated additional game, the determination including conducting a random determination in respect of at least one eligible gaming device to determine whether the respective eligible gaming device will participate in the additional game.

In an embodiment, the additional game controller comprises a random number generator and wherein the additional game controller comprises a participation module arranged to employ the random number generator to conduct each random determination.

In an embodiment, the additional game controller is arranged to conduct random determinations in respect of all of the eligible gaming devices.

In an embodiment, the additional game controller determines that least one gaming device is to participate without being subject to the random determination.

In an embodiment, a gaming device which caused the additional game to initiate is determined to participate without being subject to the random determination.

In an embodiment, at least one random determination is weighted to provide at least one gaming device with a greater probability of being a participating gaming device relative to at least one other gaming device.

In an embodiment, the additional game controller is arranged to conduct separate additional games for each gaming device which is determined to participate.

In an embodiment, the additional game controller is arranged to conduct a single additional game for all of the gaming devices which are determined to participate.

In an embodiment, the probability of at least one outcome of the additional game is controlled by the additional game controller such that at least one gaming device has a higher probability of winning the additional game than at least one other gaming device.

In an embodiment, the probability is controlled in favour of a gaming device which caused the additional game to initiate.

In a fourth aspect, the invention provides a gaming system comprising:

a plurality of gaming devices; and means for determining which of the plurality of gaming devices will participate in the initiated additional game by conducting a random determination in respect of at least one eligible gaming device to determine whether the respective eligible gaming device will participate in the additional game.

In a fifth aspect, the invention provides a gaming system comprising:

a plurality of electronic gaming machines each comprising a cabinet, a display mounted within the cabinet, at least one input device mounted to the cabinet and a game controller disposed within the cabinet comprising a processor and a memory storing game control instructions which enable each game controller operating in response to operation of a respective at least one input device by a player to conduct a respective game; and an additional game controller operably connected to the electronic gaming machines, the additional game controller comprising a processor and a memory storing additional game control instructions which when executed causes the additional game controller to determine which of the plurality of electronic gaming machines will participate in the initiated additional game by conducting a random determination in respect of at least one eligible gaming device to determine whether the respective eligible gaming device will participate in the additional game.

In a sixth aspect, the invention provides computer program code which when executed implements the above method.

In a seventh aspect, the invention provides a tangible computer readable medium comprising the above program code.

In an eighth aspect, the invention extends to transmitting the above program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Overview of Exemplary Gaming System

Figure 1:
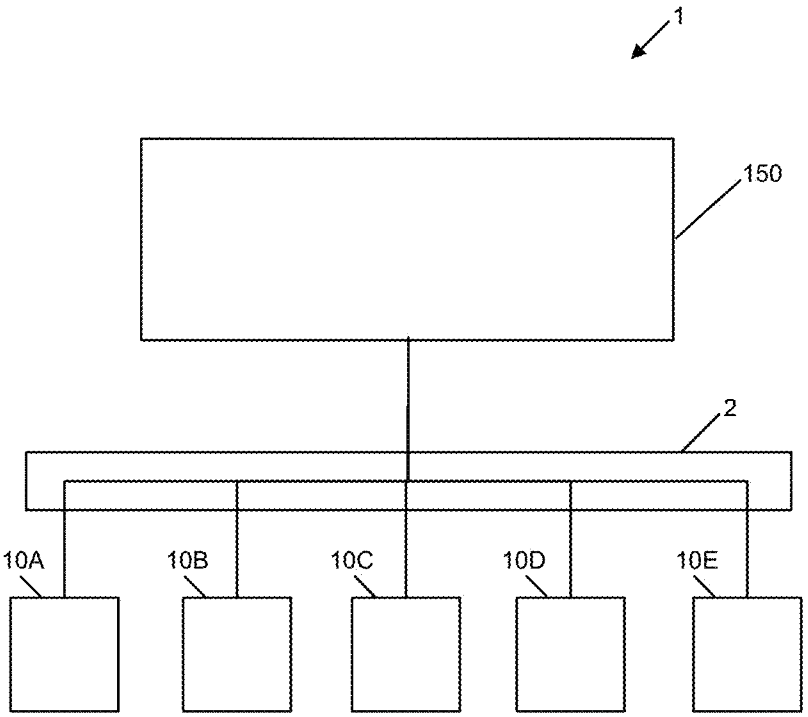
FIG. 1 is a block diagram of a gaming system with an additional game controller.

FIG. 1 shows an exemplary gaming system 1 where an additional game controller 150 is in data communication over a network 2, such as an Ethernet, with a bank of five gaming devices in the form of standalone electronic gaming machines 10. When an additional game is initiated, the additional game controller 150 is arranged to communicate with the gaming devices to determine how many are eligible and to then determine from the eligible gaming devices which gaming devices participate in the additional game. That is, not all eligible gaming devices will necessarily participate in the additional game, although depending on the embodiment, some exceptions may be made for example, for a gaming device which caused the additional game to initiate or if there is only one eligible gaming device. In the embodiment, the determination involves carrying out a random determination to determine which of the eligible gaming devices will participate. In one embodiment, the random determination is carried out in respect of all eligible gaming devices except the one which triggered the additional game, this gaming device being guaranteed entry to the additional game. In some embodiments, there is an adjustment of the odds of at least one gaming device winning the additional game. For example, if there are N eligible gaming devices and an N/M) chance of the additional game being won in any instance, chance can be apportioned amongst the participating gaming devices. For example, if there are 10 eligible gaming devices but only 5 participate each gaming device would have a 2/M chance of winning. Alternatively, the shares in the chance of eligible machines which do not participate could be allocated to the gaming machine which triggered the game such that it has an increased chance of winning. For example, for 5 participating gaming devices of 10 eligible devices, the triggering gaming device would have a chance of 6/M and the other gaming devices would have a chance of 1/M. Depending, on the embodiment, the outcome of the game can be evaluated collectively (such that only one device may win) or independently such that each participating device may win.

Gaming Devices

Gaming devices capable of participating in the method of gaming of the embodiment can take any suitable form including stand alone gaming machines and server based gaming terminals.

Figure 2:
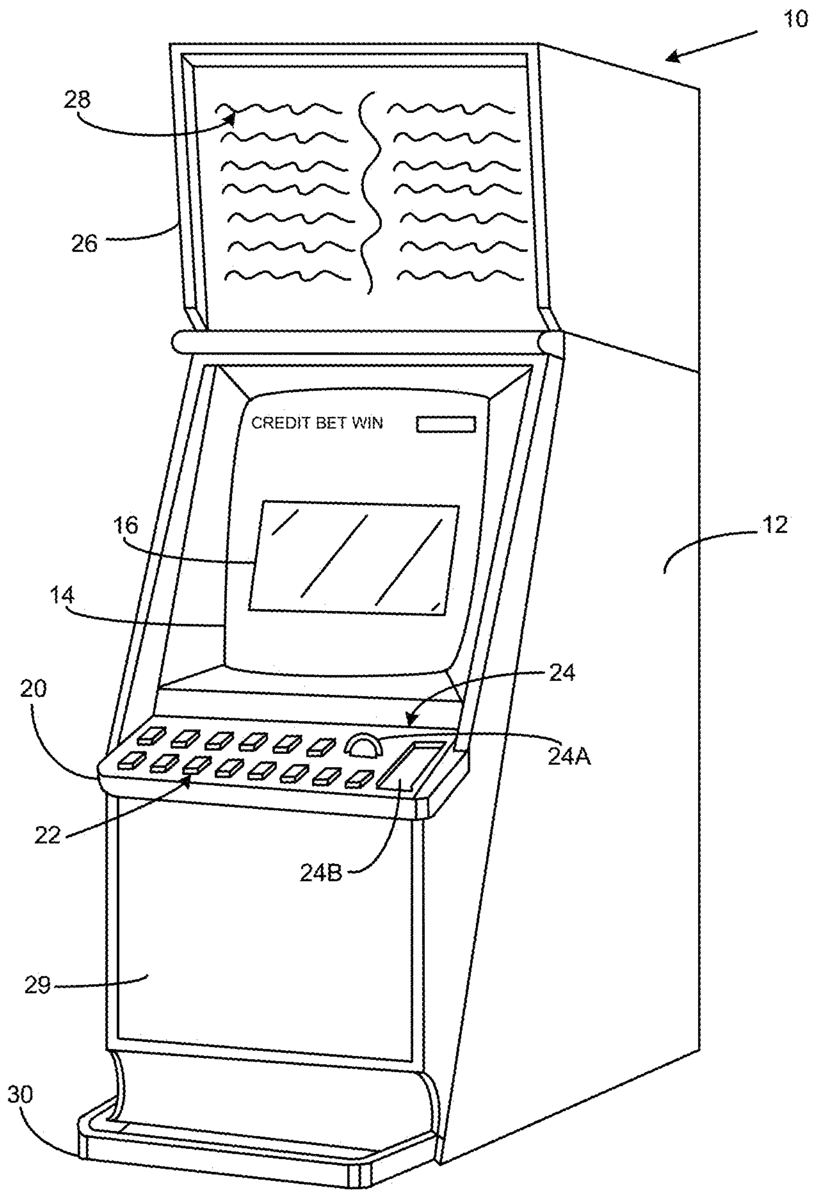
FIG. 2 is a perspective view of a stand alone gaming machine.

A gaming device in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
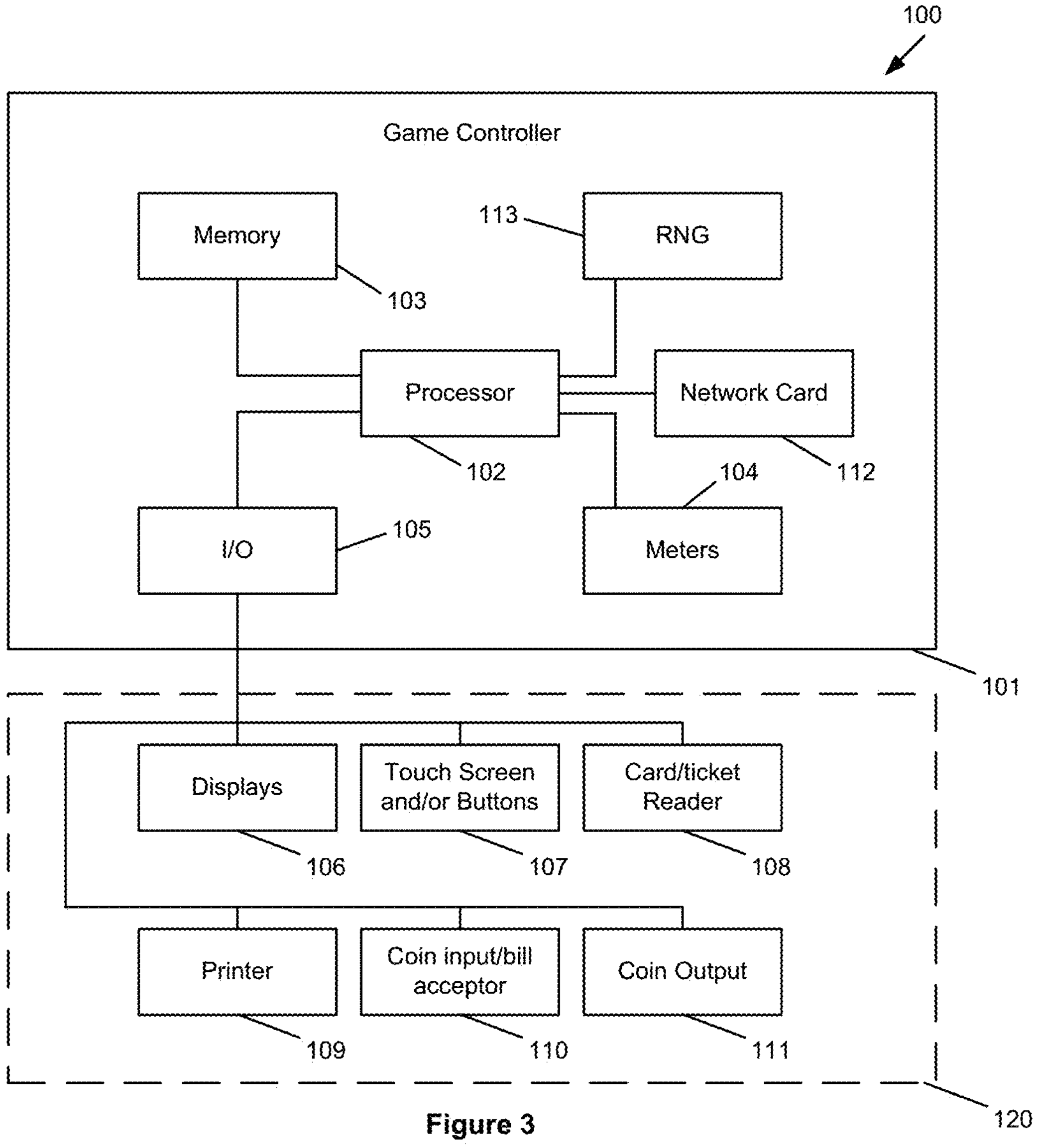
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is uses to initiate a play of the game.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
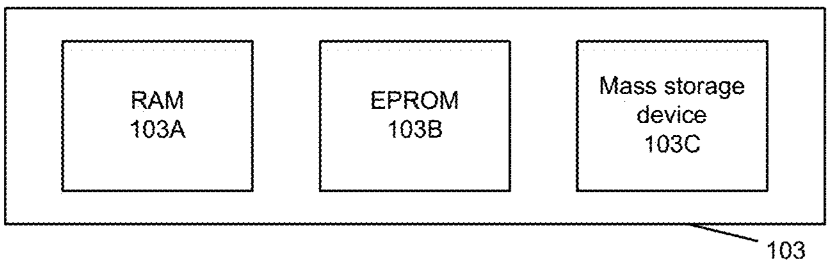
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 1038 may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a server gaming architecture can be found in WO 2006/052213 and PCT/SE2006/000559, the disclosures of which are incorporated herein by reference. In such an embodiment, an additional game controller can be provided, for example, by a dedicated server in data communication with the game server.

Figure 5:
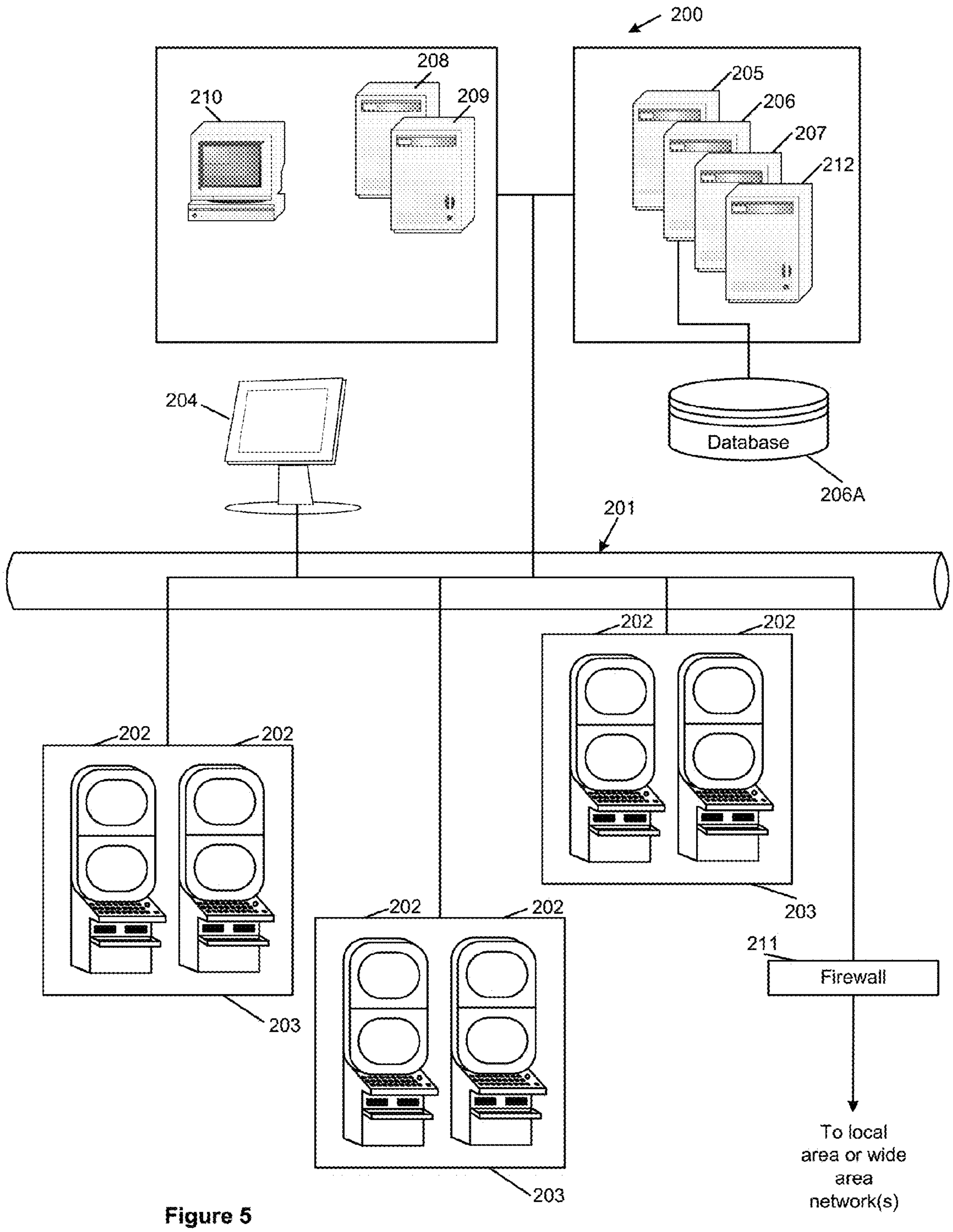
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In one example of an alternative embodiment, an additional game controller can be provided within such a network 200 by additional game server 205, such that the additional game server may implement an additional game for a plurality of different banks of gaming machines rather than a specific controller being provide for each bank of gaming machines.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided. Note also that in some embodiments, the additional game is a jackpot game and hence the additional game controller is a jackpot controller.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Figure 9:
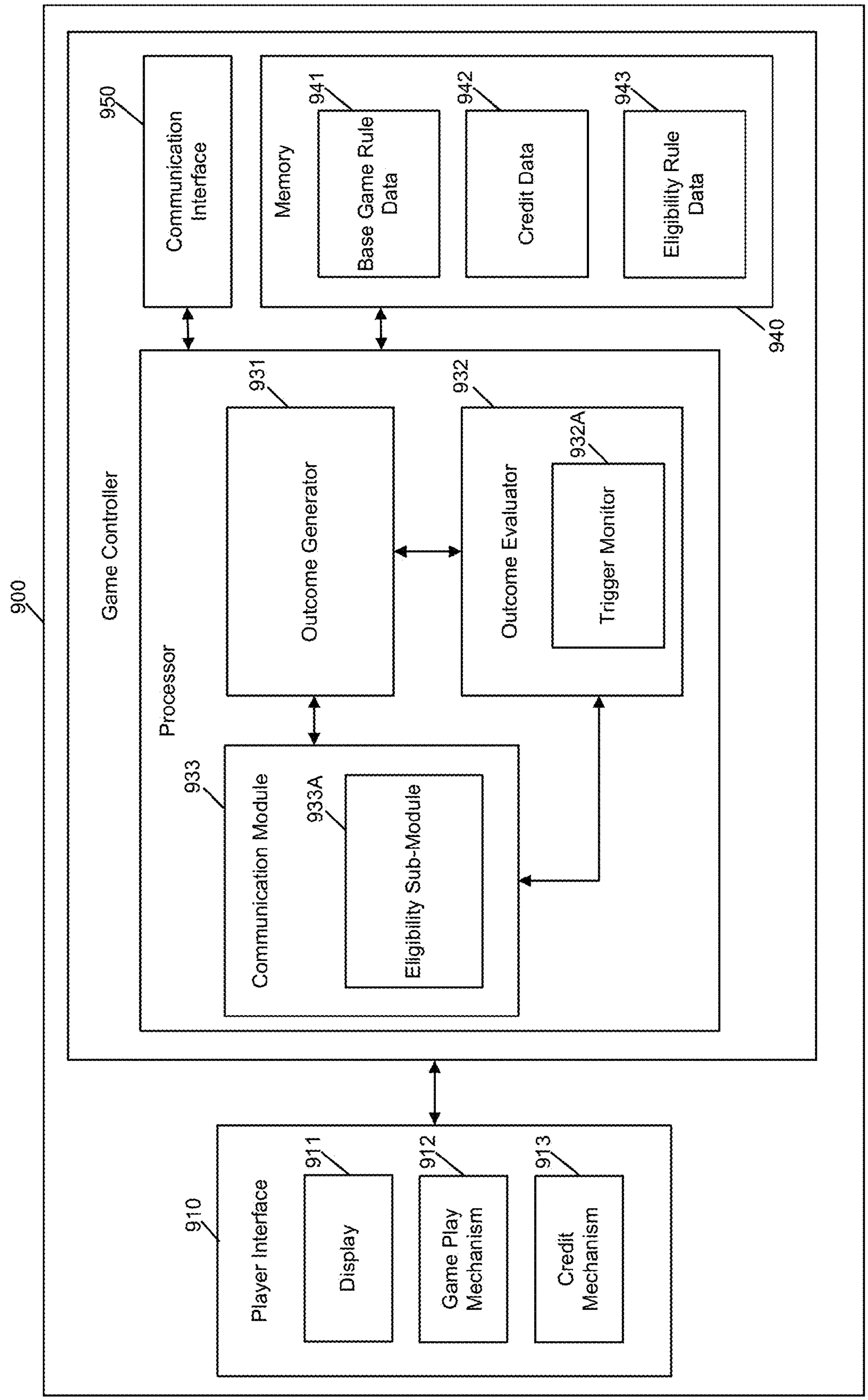
FIG. 9 is a functional block diagram of a gaming device in the form of a standalone gaming machine.

FIG. 9 is a functional block diagram of a gaming device in the form of a stand alone gaming machine. The gaming device 900 may be the same or different to gaming machine 10,100 described above. In FIG. 9, the processor 930 of game controller 920 is shown implementing a number of modules based on program code and data stored in memory 940. Persons skilled in the art will appreciate that various of the modules could be implemented in some other way, for example by a dedicated circuit.

The gaming device 900 includes a player interface 910 having a display 911 for displaying game outcomes to a player and a game play mechanism 912 including input devices such as touch screen or buttons to enable the player to interact with the game by placing wagers and entering any other instructions required to play the game. Game play mechanism 912 also enables the player to interact with the game to learn game rules etc. The player interface 910 includes a credit mechanism 913 allowing the player to input credit into the gaming device 900 and/or be paid out any winnings or remaining credit. A person skilled in the art will appreciate that other components will be present in a gaming device 900 such as those described in relation to FIGS. 2 to 4 above. The memory 940 includes program code for implementing a game including base game rule data 941 for implementing the rules of a base game.

The processor 930 when executing the program code stored in memory 940 is arranged to generate outcomes of the game in response to the operation of the game play mechanism 912. The outcomes are generated with the outcome generator 931. The outcome evaluator 932 evaluates the game outcomes that are generated based on the wager specified with the game play mechanism 912 and updates credit data 942 which stores a credit meter and a win meter for the game. The processor 930 also implements a communication module 933 which is intended to communicate by communication interface 950 with an additional game controller. As will be described in further detail below the communication module 933 is arranged to indicate to the additional game controller whether the gaming device 900 is eligible to participate in an additional game.

Accordingly, in one embodiment, the communication module includes a eligibility sub-module 933A which is intended to determine based on eligibility rule data 943 whether the gaming device 900 is eligible to participate in the additional game. In one example, eligibility rule data 943 specifies a time period and eligibility sub-module 933A determines whether a game has been concluded within a defined time period prior to receipt of a polling request from the additional game controller. In another example, the eligibility sub-module 933A also determines whether a relevant bet such as a maximum bet or an ante bet has been placed in the relevant time period. Alternatively, eligibility sub-module 933A communicates when the last game is completed. In this manner, the additional game controller 150 can determine whether the gaming device 900 is currently being played and is eligible to participate in the additional game.

Additional Game Controller and its Operation Within the Gaming System

Figure 6:
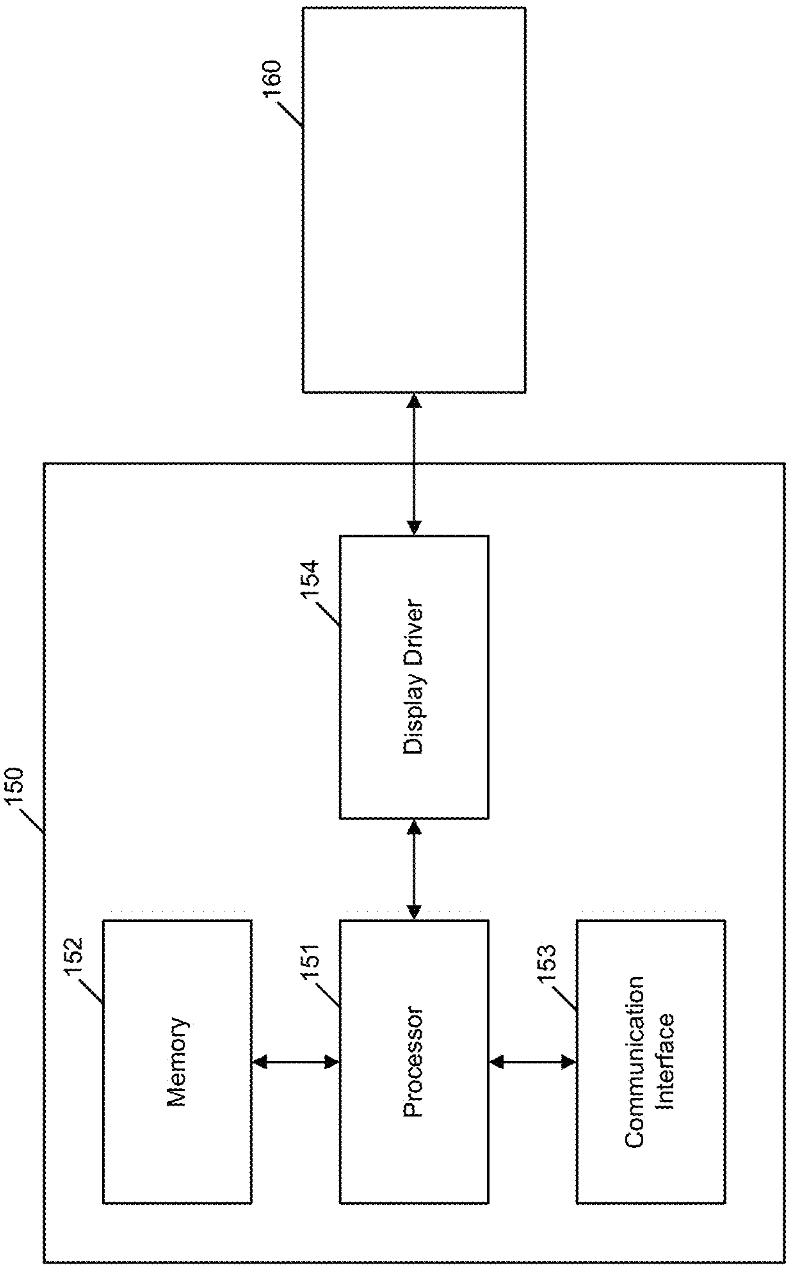
FIG. 6 is a block diagram of an additional game controller.

Referring to FIG. 6 there is shown further detail of the additional game controller 150. From FIG. 6 it will be apparent that additional game controller 150 is in data communication with a communal display 160 on which game outcomes can be displayed to the players playing the bank of gaming machines 10 shown in FIG. 1. In other embodiments, the game outcomes could be displayed on a top box of the individual gaming machines 10, rather than being displayed on a communal display, or in addition to such a display.

Referring to FIG. 6, the constitution of the additional game controller 150 is similar to that of the gaming device illustrated in relation to FIGS. 2 to 4 and FIG. 9 in that it has a processor 151 arranged to implement the additional game based on program code stored in memory 152 and a display driver 154 for driving the display 160 to show the additional game outcome. The additional game controller 150 also includes a communication interface 153 which is designed to enable the processor 151 to communicate with each of the gaming devices 10.

Persons skilled in the art will appreciate the above components are the core components for implementing a additional game but other components may be present in an additional game controller. Persons skilled in the art will appreciate that the implementation of the additional game controller is analogous to the implementation of bonus controllers and jackpot controllers in existing gaming systems and reference may be made to such controllers for further details of implementation.

Figure 7:
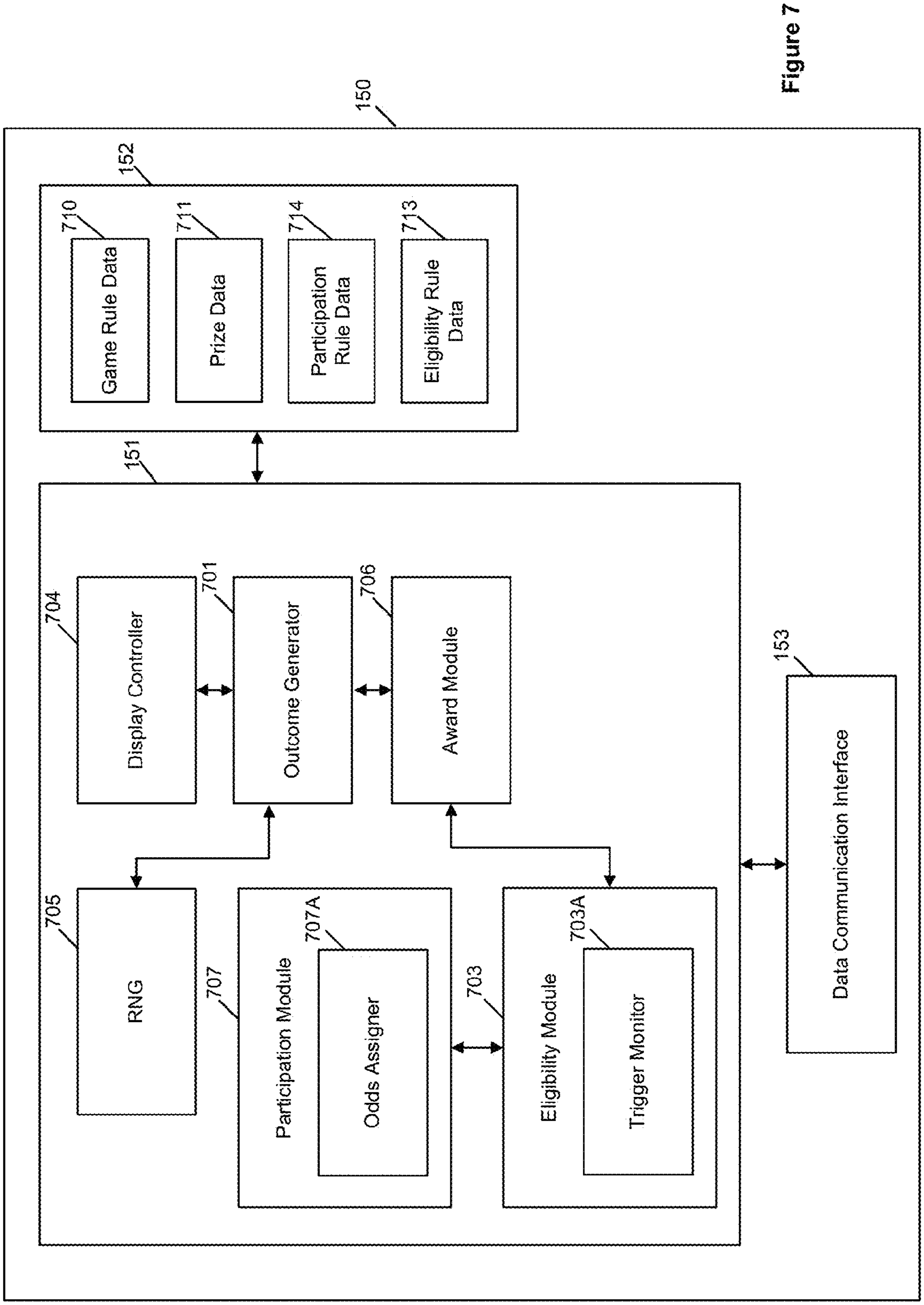
FIG. 7 is a functional block diagram of an additional game controller.

FIG. 7 is a functional block diagram of the additional gaming controller 150 which shows that the processor 151 implements a number of modules in a similar manner to the processor of the gaming device shown in FIG. 9. The processor executes program code stored in memory 152 to instantiate a eligibility module 703 which communicates via data communication interface 153 with each of the gaming devices. In one example, this communication includes polling each of the gaming devices. In another example this may be by listening to output on the network from each of the individual gaming devices. In any event, the eligibility module 703 determines based on eligibility rule data 712 the number of gaming machines which currently participating. That is, eligibility rule data 712 may specify how often the eligibility module should poll individual gaming machines or the time period within which the gaming machines need to have last indicated that they are active in order to be eligible to participate in the additional game.

Figure 8:
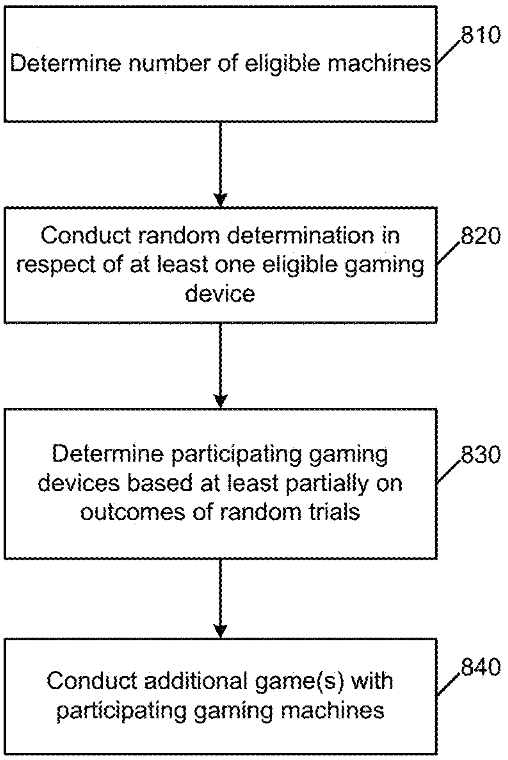
FIG. 8 is a flow chart of an embodiment.

In the specific embodiment shown in FIG. 8, the eligibility module 703 includes a trigger monitor 703A which is designed to monitor for receipt of a trigger signal from one of the gaming devices. Such a trigger signal being output by communication interface 950 by trigger monitor 932A of outcome evaluator 932 of the respective gaming device. The trigger monitor 932A is arranged to determine based on the base game rule data 941 whether a trigger condition has been met. The trigger condition can be one of any known trigger condition in the art such as a particular symbol combination being achieved in the underlying base game. When the trigger is received by the trigger monitor 703A, eligibility module 703 polls each of the gaming machines to determine whether they comply with the eligibility requirements of the additional game, in this case, whether they have been active within a defined period. The eligibility sub-module 933A of each gaming device 900 outputs whether they are active at the time based on the eligibility rule data 943 as well as data allowing the gaming machine to be identified. From these responses, eligibility module 703 determines the identity and number of gaming devices eligible for the additional game. From the eligible gaming devices, participation module 707 determines which gaming devices will participate based on participation rules 714. In this embodiment, participation rules 714 specify that the gaming device which caused the game to initiate by the trigger event occurring in respect of a game played on it, gains automatic entry to the additional game. This is advantageous as an additional game is always conducted. Thus, the participation module 707, determines which other eligible gaming devices will participate, thus assuming there is at least one other eligible gaming device, participation module 707 employs random number generator 705 to conduct a random determination in respect of each other eligible gaming device to determine which of the eligible gaming devices will participate. For example, each gaming device may have a 50:50 chance of participating. In this embodiment, the participation module 707 also comprises an odds assigner, which controls the relative and/or absolute odds of a particular gaming device winning the additional game. In this embodiment, the outcome generator 701 is arranged to use random number generator 705 to first select a jackpot of three different jackpot levels stored as prize data, which is to be played for and this is display on communal display 160. The odds of selection of the jackpots are stored as game rule data, and can be for example, such that the additional game is conducted, on average, for the major jackpot 1 in 20 times, the maxi jackpot 7 in 20 times, and the minor jackpot 12 in 20 times.

The outcome generator 701 then conducts a random determination using RNG 705 to determine whether one of the gaming devices will win the selected prize. In this example, if there are N eligible gaming devices, there is a N/M chance of the additional game being won, where M is determined by the game designer to provide an appropriate return to player. The outcome generator 705 causes random number generator 707 to return a number in the range of 1 to M. If the value falls in the range 1 to N, one of the participating gaming devices will win. In the embodiment, odds assigner 707A is arranged to assign the range 1 to N to individual participating gaming devices. This example, works in effect such that the shares in the chance of winning of eligible machines which do not participate are allocated to the gaming machine which triggered the game such that it has an increased chance of winning. For example, for 5 participating gaming devices of 10 eligible devices, the triggering gaming device would have a chance of 6/M and the other gaming devices would have a chance of 1/M such that the triggering gaming device is advantageously provided with better odds of winning.

In the above example, once a jackpot is selected the odds of each jackpot (major, maxi or minor) being awarded is the same. In other embodiments, the odds could be different, for example, there may be even chance of the jackpots being selected but lower relative odds of the major jackpot being awarded than the maxi and minor jackpots. The jackpots may be fixed prizes or progressive prizes such as are known in the art. When a prize is awarded, the award is made under control of award module 706, for example by transferring credits to the relevant gaming device.

In other embodiments, rather than a single determination being conducted by the outcome generator 701, separate determinations may be conducted for each gaming device such that more than one gaming device may win an award.

In a variation on the above embodiment, a random determination is conducted in respect of each eligible gaming device to determine which will participate. In an example of such an embodiment, each participating gaming device has the same chance of winning the jackpot. In one example of such an embodiment, the odds are apportioned equally amongst the participating gaming devices. For example, if there are 10 eligible gaming devices but only 5 participate each gaming device would have a 2/M chance of winning.

Persons skilled in the art will appreciate that while the above example describes the additional game being triggered, the additional game could instead be carried out periodically with each gaming device that played in a previous time period being eligible.

The method of embodiment is summarised in FIG. 8 which shows that the method involves determining 810 a number of participating gaming machines, conducting 820 random determinations in respect of at least one gaming device, determining 830 the number of participating gaming devices, and conducting 840 the additional game with participating gaming machines.

In the above embodiment, the additional game controller is arranged to determine the additional game outcome. In other embodiments, the additional game controller could control participation but actual outcomes could be calculated elsewhere such as by the gaming devices or another controller.

EXAMPLES

Example 1

8 machines are linked and are connected to a common maxi prize of $5000 and a common minor prize of $500.

(In this example the prize value is not progressive—i.e. it is not changing as players bet on machines. The example works equally well if the prize is progressive or of a non-cash value)

All machines are connected via an additional game controller which monitors activity on the machines and can direct messages to the machines.

All players are playing their machines.

Player on machine number 1 triggers the jackpot feature. (Triggering the jackpot feature can be in any of the known ways including but not limited to achieving an outcome on the machine, causing a machine or system event)

The additional game controller receives the message that the jackpot feature is triggered.

The additional game controller now randomly selects at least one of the machines on the link and determines that the machine will be eligible for the jackpot.

Where there are multiple jackpots available the additional game controller can determine which jackpot will be won. (This can be determined randomly or by reference to the manner in which the jackpot feature was triggered or by reference to the outcome of a feature game.)

The additional game controller sends a message to each selected machine to advise that the machine is eligible for the jackpot. If necessary, the machine will also be advised which jackpot will be won.

If the winning of the jackpot requires a feature game to be played, then the machine will now invoke the feature game.

If the additional game controller has determined which jackpot will be won, then the feature game will have an outcome to match the jackpot due to be won.

If the machine determines which jackpot is to be won, then the machine will play the feature game and the outcome of the feature game will determine which jackpot is won.

Example 2

8 machines are linked and are connected to a common maxi prize of $5000 and a common minor prize of $500.

(In this example the prize value is not progressive—i.e. it is not changing as players bet on machines. The example works equally well if the prize is progressive or of a non-cash value.)

All machines are connected via an additional game controller which monitors activity on the machines and can direct messages to the machines.

All players are playing their machines.

Player on machine number 1 triggers the jackpot feature. (triggering the jackpot feature can be in any of the known ways including but not limited to achieving an outcome on the machine, causing a machine or system event)

The additional game controller receives the message that the jackpot feature is triggered by machine 1.

The additional game controller now randomly selects at least one of the machines on the link including machine 1 and determines that the machine will be eligible for the jackpot.

If the additional game controller has selected that machine 1 and 1 other machine are eligible for the jackpot, the controller now determines that machine 1 will have a better chance of winning the maxi jackpot than the other machine.

The additional game controller will now advise the machines that a jackpot is eligible and the respective chance of winning the jackpots.

Further aspects of the method will be apparent from the above description of the gaming system. Persons skilled in the art will also appreciate that the method could be embodied in program code. The program code could be supplied in a number of ways, for example on a tangible computer readable medium, such as a disc or a memory, or as a data signal (for example, by transmitting it from a server).

Persons skilled in the art will appreciate that in some embodiments, additional or alternative eligibility criteria may be applied, for example that the player has made a certain sized wager, made an ante bet, selected all win lines, played sufficient games, or the player is a member of a loyalty program.

In embodiments, which employ a trigger event, the trigger event may be, a symbol combination in the game, occurrence of a specific symbol in the game, purchased, be caused by another connected system, based on turnover etc.

It will be understood to persons skilled in the art of the invention that many modifications may be made without departing from the spirit and scope of the invention, in particular it will be apparent that certain features of embodiments of the invention can be employed to form further embodiments.

For example, the linked game controller 150 is shown in FIG. 1 as a separate entity to the gaming devices 10. In an alternative embodiment, it could be provided by one of the gaming devices incorporating a server module arranged to implement the linked game controller in the manner described in Australian patent application 2008205413 filed 13 Aug. 2008.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with a gaming system having a plurality of gaming machines, each of the gaming machines being configured to play a base game, each gaming machine having a) a credit input mechanism configured to receive a physical item representing a monetary value for establishing a credit balance, the credit balance being increasable and decreasable based at least on wagering activity, and b) a game controller configured to play a base game in accord with having established the credit balance via the credit input mechanism receiving the physical item, and a payout mechanism, the gaming system further having an additional game controller operable to play an additional game with respect to a plurality of jackpot prizes, said additional game controller having a communication interface configured to be in communication with each of said plurality of gaming machines to receive a trigger, and a display, the method comprising:

receiving at said additional game controller a trigger from a first gaming machine of the plurality of gaming machines;

determining which of the plurality of gaming machines are eligible for an additional game, in response to receiving the trigger;

randomly selecting via the additional game controller a first jackpot prize from the plurality of jackpot prizes winnable in the additional game;

displaying on the display the randomly selected first jackpot prize winnable in the additional game;

determining via the additional game controller which eligible gaming machines will participate in the initiated additional game together with the first gaming machine participating, said determining including randomly determining whether a respective eligible gaming machine will participate in the additional game;

initiating via the additional game controller the additional game for play by the determined participating gaming machines including the first gaming machine;

determining via the additional game controller which of the participating gaming machines will have an outcome winning the randomly selected first jackpot prize, the determining including assigning via the additional game controller a higher probability of winning the randomly selected first jackpot prize to the first gaming machine based on a number of eligible gaming machines that are not participating in the additional game with respect to the number of gaming machines participating in the additional game; and providing the selected first jackpot prize via the payout mechanism of the gaming machine winning the first jackpot prize.

2. A method as claimed in claim 1, wherein said randomly determining whether a respective eligible gaming machine will participate in the additional game includes randomly determining in respect of all of the eligible gaming machines.

3. A method as claimed in claim 1, wherein said randomly determining whether a respective eligible gaming machine will participate in the additional game, together with the first gaming machine participating, is weighted to provide at least one gaming machine with a greater probability of being a participating gaming machine relative to at least one other gaming machine.

4. A method as claimed in claim 1, and further including initiating the additional game in response to said receiving a trigger.

5. A method as claimed in claim 4, and further including generating the trigger in response to a trigger event occurring on one of the eligible gaming machines.

6. A method as claimed in claim 1, wherein said determining which of the plurality of gaming machines are eligible for an additional game includes determining based on which gaming machines have been active in a designated period.

7. A method as claimed in claim 1, wherein said determining which of the plurality of gaming machines are eligible for an additional game includes determining based on whether a designated wager has been made.

8. A method as claimed in claim 1, wherein said determining which of the plurality of gaming machine are eligible for an additional game includes determining by deeming each of a plurality of designated gaming machines to be an eligible gaming machine.

9. A method as claimed in claim 1, comprising conducting separate additional games for each gaming machine which is determined to participate.

10. A method as claimed in claim 1, comprising conducting a single additional game for all of the gaming machines which are determined to participate.

11. A gaming system comprising:

a plurality of gaming machines, each gaming machine operable for independent play of a base game, and having a) a credit input mechanism configured to receive a physical item representing a monetary value for establishing a credit balance, the credit balance being increasable and decreasable based at least on wagering activity, and b) a game controller configured to play a base game in accord with having established the credit balance via the credit input mechanism receiving the physical item, and a payout mechanism;

a display configure to display a jackpot prize winnable in an additional game; and an additional game controller in data communication with the gaming devices, the additional game controller configured to receive a trigger from a first gaming machine of the plurality of gaming machines, determine in response to receiving the trigger which of the plurality of gaming machines are eligible for an additional game, randomly select a first jackpot prize from the plurality of jackpot prizes winnable in the additional game, causes the display to display the randomly selected first jackpot prize winnable in the additional game, determine which of the plurality of gaming machines will participate in the initiated additional game together with the first gaming machine participating, the determination including conducting a random determination whether a respective eligible gaming machine will participate in the additional game, initiate the additional game for play by at least one of the gaming machines including the first gaming machine, determine via the additional game controller which of the participating gaming machines will have an outcome winning the randomly selected first jackpot prize, the determining including assigning via the additional game controller a higher probability of winning the randomly selected first jackpot prize to the first gaming machine based on a number of eligible gaming machines that are not participating in the additional game with respect to the number of gaming machines participating in the additional game, and provide the selected first jackpot prize via the payout mechanism of the gaming machine winning the first jackpot prize.

12. A gaming system as claimed in claim 11, the additional game controller randomly determines in respect of all of the eligible gaming machines.

13. A gaming system as claimed in claim 11, wherein said randomly determining whether a respective eligible gaming machine will participate in the additional game, together with the first gaming machine participating, is weighted to provide at least one gaming machine with a greater probability of being a participating gaming machine relative to at least one other gaming machine.

* * * * *